US012600325B2

(12) United States Patent
Mokashi et al.

(10) Patent No.: US 12,600,325 B2
(45) Date of Patent: Apr. 14, 2026

(54) SYSTEM AND METHOD FOR CONTROLLING A VEHICLE BRAKE TO PREVENT VEHICLE ROLL AWAY

(71) Applicant: KB Intellectual Property GmbH & Co. KG, Pullach (DE)

(72) Inventors: Niket Mokashi, Wakad (IN); Daniel S. Reifman, Cleveland, OH (US); Abhir R. Agashe, Aurangabad (IN); Pravin Kokane, Tathwade (IN)

(73) Assignee: KB Intellectual Property GmbH & Co. KG, Pullach (DE)

( * ) Notice: Subject to any disclaimer, the term of this patent is extended or adjusted under 35 U.S.C. 154(b) by 35 days.

(21) Appl. No.: 18/750,342

(22) Filed: Jun. 21, 2024

(65) Prior Publication Data

US 2025/0388195 A1 Dec. 25, 2025

(51) Int. Cl.
  *B60T 7/12* (2006.01)
  *B60T 13/68* (2006.01)
(52) U.S. Cl.
  CPC .............. *B60T 7/12* (2013.01); *B60T 13/683* (2013.01); *B60T 2201/10* (2013.01)
(58) Field of Classification Search
  CPC ....... B60T 7/12; B60T 13/683; B60T 2201/10
  See application file for complete search history.

(56) References Cited

U.S. PATENT DOCUMENTS 10,017,166 B2 7/2018 Choi
11,433,866 B2 9/2022 Hecker et al.

2009/0160245 A1 6/2009 Accardi
2011/0005874 A1 1/2011 Beier et al.
2014/0015310 A1* 1/2014 Hanzawa .............. B60T 13/741
                                                        303/3
2014/0054118 A1* 2/2014 Rogers .................. B60T 13/662
                                                        188/170
2014/0149011 A1* 5/2014 Eberling ............... B60T 8/1708
                                                        701/70

(Continued)

FOREIGN PATENT DOCUMENTS

EP          3197735 B1    11/2018
EP          3317149 B1    10/2019

OTHER PUBLICATIONS

International Search Report and Written Opinion issued in corresponding International (PCT) Patent Application No. PCT/EP2025/063881 (Jul. 30, 2025).

*Primary Examiner* — George C Jin
(74) *Attorney, Agent, or Firm* — Reising Ethington P.C.

(57) ABSTRACT

A brake control system for a vehicle includes electropneumatic modules that control fluid pressure to brake actuators for wheel brakes to apply and release service and parking brakes. A parking brake controller (i) determines whether the parking brake is in an applied state or a released state, (ii) whether a speed of the vehicle meets a predetermined condition relative to a predetermined speed and (iii) whether a command to move the service brake to an applied state has been issued by a service brake controller. When conditions (i), (ii) and (iii) are present, the controller identifies an absence of communication on a communications bus indicative of a failure in the service brake controller and/or the communications bus and thereafter generates a control signal configured to cause to move the parking brake from the released state to an applied state.

20 Claims, 2 Drawing Sheets

(56)         References Cited

U.S. PATENT DOCUMENTS

| | | | |
|---|---|---|---|
| 2021/0163039 A1 | 6/2021 | Iwamoto et al. | |
| 2022/0410857 A1* | 12/2022 | Li | B60T 8/92 |
| 2023/0347854 A1 | 11/2023 | Subramanian | |
| 2024/0017701 A1* | 1/2024 | van Thiel | B60T 7/12 |

* cited by examiner

SYSTEM AND METHOD FOR CONTROLLING A VEHICLE BRAKE TO PREVENT VEHICLE ROLL AWAY

BACKGROUND OF THE INVENTION a. Field of the Invention

This disclosure relates to braking systems for vehicles. In particular, this disclosure relates to a system and method that apply a parking brake when conditions are identified indicating the possible failure of a system on the vehicle that applies a service brake to prevent vehicle roll away.

b. Background Art

Conventional vehicles often include systems that are intended to prevent the vehicle from rolling away in situations where movement of the vehicle is undesirable, but the operator of the vehicle fails to apply a service brake. For example, a system may cause application of a service brake to prevent vehicle roll away when a system determines that the vehicle is in motion, but the operator is no longer in control of the vehicle because the operator is incapacitated or has exited the vehicle. A system may also cause application of a service brake to prevent vehicle roll away when the system determines the vehicle is started while on a hill (hill start assist).

Conventional systems that cause application of the service brake to prevent vehicle roll away may occasionally fail. Conventional systems are implemented using electric power and signaling. Therefore, a loss of power to the system, a catastrophic failure of the system or component such as a fuse, or a failure in a communications bus through which data signals are received by the system and control signals are transmitted by the system may all result in a failure to prevent vehicle roll away when required.

The inventors herein have recognized a need for a brake control system for a vehicle and related method that will minimize and/or eliminate one or more of the above-identified deficiencies.

BRIEF SUMMARY OF THE INVENTION

This disclosure relates to braking systems for vehicles. In particular, this disclosure relates to a system and method that apply a parking brake when conditions are identified indicating the possible failure of a system on the vehicle that applies a service brake to prevent vehicle roll away.

An embodiment of a brake control system for a vehicle includes a fluid circuit including a first electropneumatic module configured to control fluid pressure in a brake actuator for a first wheel brake to apply and release a service brake and a second electropneumatic module configured to control fluid pressure in a brake actuator for one of the first wheel brake and a second wheel brake to apply and release a parking brake. The system further includes a parking brake controller configured to determine whether the parking brake is in an applied state or a released state, determine whether a speed of the vehicle meets a predetermined condition relative to a predetermined speed, and determine whether a command to move the service brake to an applied state has been issued by a service brake controller. The parking brake controller is further configured to identify, when (i) the parking brake is in the released state, (ii) the speed of the vehicle meets the predetermined condition relative to the predetermined speed, and (iii) the command to move the service brake to the applied state has been issued by the service brake controller, an absence of communication on a communications bus. The parking brake controller is further configured to generate, after identifying the absence of communication on the communications bus, a parking brake control signal configured to cause the second electropneumatic module to exhaust fluid pressure from the brake actuator for the one of the first wheel brake and the second wheel brake to move the parking brake from the released state to an applied state.

An embodiment of an article of manufacture includes a non-transitory computer storage medium having a computer program encoded thereon that, when executed by a parking brake controller of a brake control system for a vehicle, controls application of a parking brake. The brake control system includes a fluid circuit including a first electropneumatic module configured to control fluid pressure in a brake actuator for a first wheel brake to apply and release a service brake and a second electropneumatic module configured to control fluid pressure in a brake actuator for one of the first wheel brake and a second wheel brake to apply and release the parking brake. The computer program include code for determining whether the parking brake is in an applied state or a released state, determining whether a speed of the vehicle meets a predetermined condition relative to a predetermined speed, and determining whether a command to move the service brake to an applied state has been issued by a service brake controller. The computer program further includes code for identifying, when (i) the parking brake is in the released state, (ii) the speed of the vehicle meets the predetermined condition relative to the predetermined speed, and (iii) the command to move the service brake to the applied state has been issued by the service brake controller, an absence of communication on a communications bus. The computer program further includes code for generating, after identifying the absence of communication on the communications bus, a parking brake control signal configured to cause the second electropneumatic module to exhaust fluid pressure from the brake actuator for the one of the first wheel brake and the second wheel brake to move the parking brake from the released state to an applied state.

An embodiment of a method for controlling application of a parking brake of a brake control system for a vehicle is also provided. The brake control system includes a fluid circuit including a first electropneumatic module configured to control fluid pressure in a brake actuator for a first wheel brake to apply and release a service brake and a second electropneumatic module configured to control fluid pressure in a brake actuator for one of the first wheel brake and a second wheel brake to apply and release the parking brake. The method comprises determining whether the parking brake is in an applied state or a released state, determining whether a speed of the vehicle meets a predetermined condition relative to a predetermined speed, and determining whether a command to move the service brake to an applied state has been issued by a service brake controller. The method further includes identifying, when (i) the parking brake is in the released state, (ii) the speed of the vehicle meets the predetermined condition relative to the predetermined speed, and (iii) the command to move the service brake to the applied state has been issued by the service brake controller, an absence of communication on a communications bus. The method further includes generating, after identifying the absence of communication on the communications bus, a parking brake control signal configured to cause the second electropneumatic module to exhaust fluid pressure from the brake actuator for the one of the first wheel brake and the second wheel brake to move the parking brake from the released state to an applied state.

A brake control system and method in accordance with the teachings disclosed herein is advantageous relative to conventional systems and methods. In particular, the system and method prevent vehicle roll away by applying a parking brake when conditions are identified that are indicative of a possible failure of a system on the vehicle that would ordinarily apply a service brake to prevent vehicle roll away.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
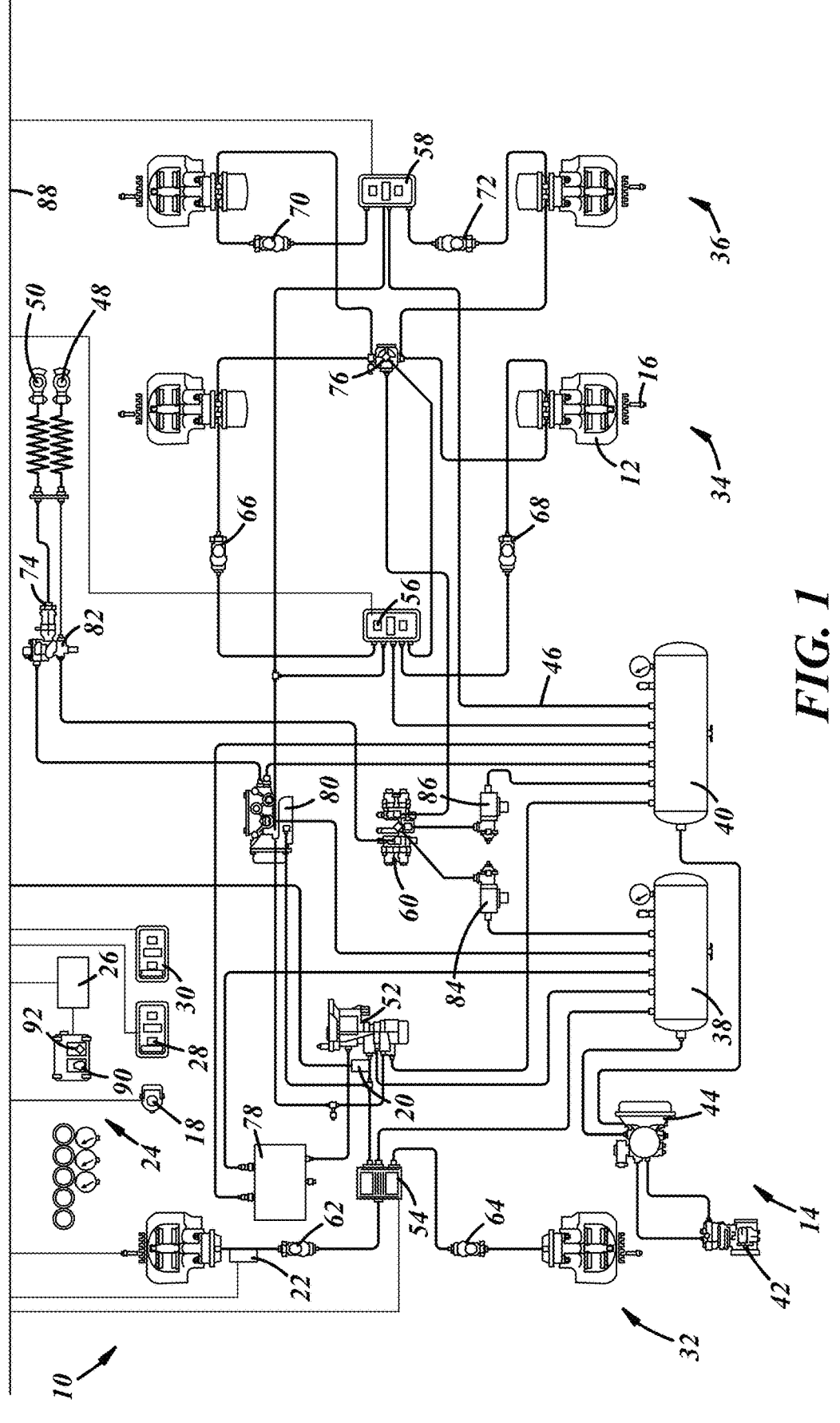
FIG. 1 is a diagrammatic view of a brake control system for a vehicle in accordance with the teachings set forth herein.

Referring now to the drawings wherein like reference numerals are used to identify identical components in the various views, FIG. 1 illustrates one embodiment of a brake control system 10 for a vehicle. In the illustrated embodiment, the vehicle comprises a heavy commercial vehicle and, in particular, a tractor or power unit configured for towing one or more trailers or towed units. It should be understood, however, that the systems and methods disclosed herein may find application on other types of commercial vehicles including, for example, tractors operating without trailers, buses, etc. and may also find application on non-commercial vehicles. System 10 is configured to brake one or more wheels in order to slow, stop or prevent movement of the vehicle. System 10 may be configured to brake the vehicle in response to commands from an operator of the vehicle, but may also be configured to implement autonomous braking (i.e., without commands from the operator of the vehicle) as part of an advanced driver assistance system (ADAS) or automated driving system (ADS) in order to provide various functions such as automated emergency braking (AEB), anti-lock braking (ABS), collision avoidance, adaptive cruise control, traction control or stability control. System 10 may include one or more wheel brakes 12, a fluid circuit 14 that generates and transmits fluid pressure to wheel brakes 12, sensors that identify various conditions associated with the vehicle and the surrounding environment and that impact braking of the vehicle including wheel speed sensors 16, steer angle sensor 18 and pressure sensors 20, 22, an operator interface 24 and several controllers including a dash interface controller 26, a service brake controller 28, and a parking brake controller 30.

Wheel brakes 12 are configured to apply a braking force to one or more wheels on the vehicle. In the illustrated embodiment, wheel brakes 12 are located at each end of a steer axle 32, a drive axle 34 and an auxiliary axle 36 (which may, for example, also comprise a drive axle in certain embodiments). Brakes 12 may comprise disc brakes in which a carrier supports brake pads on opposite sides of a rotor rotating with the wheel and a brake actuator causes, responsive to fluid pressure delivered by fluid circuit 14 or another force, movement of a caliper relative to the carrier to move the brake pads into and out of engagement with the rotor. Alternatively, wheel brakes 12 may comprise drum brakes in which a brake actuator causes, responsive to fluid pressure delivered by fluid circuit 14 or another force, movement of one or more brake shoes into and out of engagement with a braking surface in a brake drum rotating with the wheel. Wheel brakes 12 may be configured to function as both a service brake for applying service braking while the vehicle is an active state and as a parking brake for applying parking or emergency braking while the vehicle is an active or inactive state. To enable functionality as a service brake, the brake actuator for wheel brake 12 may include a member (e.g., a pushrod connected to a diaphragm) that is moved in one direction responsive to the presence of fluid pressure to move the wheel brake 12 to an applied state and in the opposite direction responsive to the absence of fluid pressure to move the wheel brake 12 to a released state. To enable functionality as a parking brake, the brake actuator for wheel brake 12 may include a spring that biases the wheel brake 12 to an applied state. Fluid pressure provided to the brake actuator is used to overcome the force of the spring and move the wheel brake 12 to a released state.

Fluid circuit 14 generates fluid pressure within system 10 and controls the delivery of fluid pressure to the brake actuator of each wheel brake 12 to apply or release either or both of a service brake and a parking brake depending on the configuration of the wheel brake 12. Circuit 14 may include components for generating and storing pressurized fluid including fluid sources or reservoirs 38, 40, a compressor 42, and an air treatment module 44 and components for routing and delivering fluid pressure to wheel brakes 12 including fluid conduits 46, glad-hand connectors 48, 50 between the tractor and any trailers, and various devices for controlling the flow of fluid within circuit 14 including a foot brake module 52, electropneumatic modules 54, 56, 58, 60, modulators 62 64, 66, 68, 70, 72, 74, a quick release valve 76, a booster module 78, a trailer control module 80, a tractor protection valve 82, and solenoid valves 84, 86. Each of foot brake module 52, electropneumatic modules 54, 56, 58, 60, modulators 62 64, 66, 68, 70, 72, 74, booster module 78, and trailer control module 80 may transmit to and/or receive signals from one or more of controllers 26, 28, 30 either through direct electrical connections or over a conventional vehicle communications bus 88 implementing a communications network such as a controller area network (CAN) or local interconnect network (LIN) or over a vehicle power line through power line communication (PLC) in accordance with various industry standard protocols including by not limited to SAE J1939, SAEJ1922, and SAE J2497 or using a proprietary protocol.

Fluid sources 38, 40 store compressed fluid for use in applying wheel brakes 12. Fluid source 38 has a fluid port coupled to air treatment module 44 and fluid ports coupled to foot brake module 52, electropneumatic module 54, booster module 78, trailer control module 80 and solenoid valve 84. Fluid source 40 has a fluid port coupled to air treatment module 44 and fluid ports coupled to foot brake module 52, electropneumatic modules 56, 58, booster module 78, trailer control module 80 and solenoid valve 86.

Compressor 42 draws in air and compresses the air for delivery to fluid sources 38, 40 through air treatment module 44. Compressor 42 has one or more fluid ports coupled to air treatment nodule 44.

Air treatment module 44 is provided to collect and remove solid, liquid and vapor contaminants from pressurized fluid provided by compressor 42. Air treatment module 44 is disposed between compressor 42 and fluid sources 38, 40 and has fluid ports coupled to compressor 42 and each fluid source 38, 40.

Fluid conduits 46 are used to transport fluid between fluid sources 38, 40, compressor 42, air treatment module 44, glad-hand connectors 48 50, foot brake module 52, electropneumatic modules 54, 56, 58, 60, modulators 62, 64, 66, 68, 70, 72, 74, quick release valve 76, booster module 78, trailer control module 80, tractor protection valve 82 and solenoid valves 84, 86. Conduits 46 may be made from conventional metals and/or plastics and have connectors at either end configured to join the conduits 46 to corresponding components of circuit 14.

Glad hand connectors 48, 50 are provided to transmit pressurized fluid from the tractor to any trailers coupled to the tractor. One of connectors 48 is used to transmit supply/emergency fluid pressure while the other connector 50 is used to transmit service/control fluid pressure.

Foot brake module 52 provides an interface through which a vehicle operator may input a command to apply wheel brakes 12 and control the delivery of fluid pressure to wheel brakes 12 for service braking. Module 52 includes a brake pedal that may be actuated by the operator. Actuation of the brake pedal opens a valving member in foot brake module 52 that allows fluid pressure from fluid sources 38, 40 to flow to electro-pneumatic modules 54, 56, 58. If the vehicle is operated autonomously (without operator inputs), foot brake module 48 acts as a relay valve forwarding fluid pressure from fluid sources 38, 40 or booster module 78 to electropneumatic modules 54, 56, 58. It should be understood that foot brake module 52 includes one example of an operator controlled valve for service braking, but that other types of operator controlled valves for service braking may be used in addition to, or as an alternative to, the valve in foot brake module 52.

Electropneumatic modules 54, 56, 58 are provided to control delivery of fluid pressure to wheel brakes 12 on steer axle 32, drive axle 34 and auxiliary axle 36, respectively, to for use in controlling the application and release of service brakes in wheel brakes 12. Module 54 may define a single fluid channel configured to deliver the same fluid pressure to wheel brakes 12 on either end of steer axle 32. Modules 56, 58, may define a pair of fluid channels permitting delivery of varying fluid pressure to the wheel brakes on either end of drive axle 34 and auxiliary axle 36 for use in stability control. Modules 54, 56, 58 includes one or more relay valves that deliver fluid pressure from a corresponding fluid source 38, 40 to wheel brakes 12 or exhausts fluid pressure from wheel brakes 12 responsive to a control pressure from foot brake module 52. The relay valves increase the volume of fluid, and therefore the flow, at which fluid is delivered to, and exhausted from, wheel brakes 12 in order to reduce lag times between the commanded and actual application and release of wheel brakes 12. Modules 54, 56, 58 further includes solenoid valves configured to regulate the control pressure from foot brake module 52 and, therefore, control the operation of the relay valve. An electronic control unit in each module 54, 56, 58 controls the operation of the solenoid valves responsive to control signals from controller 28. The electronic control unit may also process signals from pressure sensors within modules 54, 56, 58 and from wheel speed sensors and brake lining wear sensors associated with corresponding wheels and wheel brakes 12, respectively, and may generate and transmit signals indicative of fluid pressure, wheel speed and brake lining wear to any of controllers 26, 28, 30. Modules 54, 56, 58 may transmit signals to and/or receive signals from controllers 26, 28, 30 indirectly over bus 88 or, alternatively, through dedicated electrical connections with controllers 26, 28, 30.

Electropneumatic module 60, sometimes referred to as a park valve module, is provided to control delivery of fluid pressure to wheel brakes 12 on drive axle 34 and auxiliary axle 36 and any trailers for use in controlling the application and release of parking brakes in wheel brakes 12. Module 60 may define a pair of fluid channels. Module 60 includes supply ports that are coupled to delivery ports on solenoid valves 84, 86, respectively. A double check valve in module 60 outputs the greater of the fluid pressures at the supply ports to each fluid channel. Module 60 further includes delivery ports coupled to supply ports on quick release valve 76 and tractor protection valve 82 and exhaust ports. Solenoid piloted valves in module 60 control fluid flow in each channel and are spring-biased to a first position connecting the delivery ports to the exhaust ports to vent the conduits between module 60 and quick release valve 76 and between module 60 and tractor protection valve 82 to atmosphere and thereby maintain the parking brakes in an applied state. An electronic control unit (not shown) in module 60 energizes the solenoid piloted valves responsive to control signals from one of controllers 26, 30 to move the valves to a second position connecting the output of the double check valve and the delivery ports to provide fluid pressure to quick release valve 76 and tractor protection valve 82 and, ultimately, move the parking brakes to a released state. The electronic control unit may also process signals from pressure sensors within module 60 and may generate and transmit signals indicative of fluid pressure to and of controllers 26, 28, 30. Module 60 may transmit signals to and/or receive signals from controllers 26, 28, 30 indirectly over bus 88 or, alternatively, through dedicated electrical connections with controllers 26, 28, 30.

Modulators 62, 64, 66, 68, 70, 72, 74 are provided to implement anti-lock braking and electronic stability control functions. During normal braking, modulators 62, 64, 66, 68, 70, 72, 74 allow fluid pressure to pass from electropneumatic modules 54, 56, 58 to wheel brakes 12 and from tractor protection valve 82 to any trailers without interference. During a loss of traction, however, signals from controller 28 cause modulators 62, 64, 66, 68, 70, 72, 74 to modulate the fluid pressure to prevent lockup of the vehicle wheels. Modulators 62, 64, 66, 68, 70, 72 have supply ports coupled to delivery ports in electropneumatic modules 54, 56, 58 and delivery ports coupled to wheel brakes 12. Modulator 74 has a supply port coupled to tractor protection valve 82 and a delivery port coupled to glad hand connector 50.

Quick release valve 76 transmits fluid pressure from electropneumatic module 60 to the brake actuators for the wheel brakes 12 on drive axle 34 and auxiliary axle 36 and exhausts fluid from wheel brakes 12 in the absence of fluid pressure from electropneumatic module 60 to release and apply parking brakes in wheel brakes 12. Valve 76 has a supply port in fluid communication with a delivery port on electropneumatic module 60 and delivery ports in fluid communication with the brake actuators for the wheel brakes 12 on drive axle 34 and auxiliary axle 36. Valve 76 further has a balance port in fluid communication with electropneumatic module 56 to prevent compounding during service braking.

Trailer control module 80 enables control of the wheel brakes on any trailers independent of the wheel brakes 12 on the tractor. Trailer control module 80 includes supply ports in fluid communication with fluid sources 38, 40, a delivery port in fluid communication with tractor protection valve 82 and control ports in fluid communication with foot brake module 52.

Tractor protection valve 82 transmits pneumatic signals relating to operation of the trailer wheel brakes from the tractor to any trailers to enable control of wheel brakes on trailers by system 10. Valve 82 also protects the fluid supply for the tractor in the event of a failure in the fluid connection between the tractor and trailers. Valve 82 includes a supply port and a control port in fluid communication with elec- tropneumatic module 60 and trailer control module 78, respectively, and delivery ports in fluid communication with gladhand connector 48 and modulator 74.

Solenoid valves 84, 86 control delivery of fluid pressure to, and venting of fluid pressure from, conduits 46 between solenoid valves 84, 86 and electropneumatic module 60. Solenoid valves 84, 86 may comprise conventional three way, two position valves each having a supply port in communication with a corresponding fluid source 38, 40, a delivery port in fluid communication with a corresponding supply port in electropneumatic module 60, and an exhaust port. Valves 84, 86 are biased to a first state in which a fluid path is established between the supply and delivery ports of each valve 84, 86 to deliver fluid pressure from fluid sources 38, 40 to electropneumatic module 60 thereby enabling the parking brakes in wheel brakes 12 to remain in a released state. When energized, valves 84, 86 move from the first state to a second state in which a fluid path is established between the delivery and exhaust ports of each valve 84, 86 to vent fluid pressure from the conduits 46 between valves 84, 86 and electropneumatic module 60.

Sensors 16, 18, 20, 22 are provided to identify various conditions associated with the vehicle and the surrounding environment including conditions that may impact the operation of system 10. In the illustrated embodiment, sensor 16 comprises a wheel speed sensor configured to output a signal indicative of the rotational speed of a wheel for use in anti-lock braking and traction control. In accor- dance with one aspect of the teachings disclosed herein below, the output of sensor 16 may also be used in assessing whether to apply a parking brake to prevent roll away of vehicle 10. Sensor 18 comprises a steer angle sensor con- figured to output a signal indicative of the rotational position of a steering shaft for stability control. Sensors 20, 22 comprise pressure sensors configured to output pressure signals indicative of the fluid pressures at various locations within system 10. In particular, sensor 20 generates a pressure signal indicative of fluid pressure delivered from foot brake module 52 to electropneumatic module 54 while sensor 22 generates a pressure signal indicative of fluid pressure delivered to a brake actuator for wheel brake 12. Although only two pressure sensors 20, 22 are illustrated in FIG. 1 it should be understood that similar pressure sensors may be located throughout fluid circuit 14 including at each wheel end. It should be understood that system 10 may include a variety of other sensors that may impact control of system 10 including for example, yaw angle sensors and load sensors. Sensors 16, 18, 20, 22 may communicate with one or more of controllers 26, 28 30 and/or other vehicle systems indirectly over communication bus 88 or, alterna- tively, through dedicated electrical connections with con- trollers 26, 28, 30.

Operator interface 24 provides an interface between the vehicle operator and system 10 through which the operator can control certain vehicle braking functions and receive information about vehicle braking. In the illustrated embodi- ment, for example, interface 24 allows the operator to control the fluid supply in any trailers coupled to the tractor and allows the operator to control the parking brake function of certain wheel brakes 12. Interface 24 may be mounted within the cabin of the tractor of the vehicle and, in particular, on the dashboard of the vehicle. Interface 24 may include one or more handles 90, 92 movable between a "pull" position, a "push" position and a neutral position between the "push" and "pull" positions. In the illustrated embodiment, handle 90 may be pulled to exhaust the trailer fluid supply and pushed to supply the trailer fluid supply while handle 92 may be pulled to apply a parking brake (e.g., by exhausting fluid from a brake actuator for a wheel brake 12 to allow a spring to apply the parking brake) and release the parking brake (e.g., by delivering fluid to the brake actuator for the wheel brake 12 opposing the spring to release the parking brake). When the operator actuates interface 24 and moves either of handles 90, 92 to either a "pull" or "push" position, interface 24 generates and trans- mits a command signal to controller 26 which generates corresponding control signals to implement the command. When the operator does not actuate interface 24 and handles 90, 92 remains in the neutral position, interface 24 does not generate or transmit a command signal to controller 26. Interface 24 may include further include light emitters, such as light emitting diodes, sound emitters, such as a speaker, and/or haptic actuators to convey visual, audio and/or haptic messages to the vehicle operator. In the case of visual alerts, different information can be conveyed through differences in color, differences in intensity, differences in the number of lights, and differences in the pattern of activation of the lights. In the case of audio alerts, different information can be conveyed through differences in the type of sound gen- erated, differences in volume and differences in the pattern of sounds. In the case of haptic alerts, different information can be conveyed through differences in the length, intensity or pattern of vibration. Although a particular form of opera- tor interface 24 is disclosed herein, it should be understood that the form of operator interface 24 may vary. Interface 24 could for example comprise one or more push buttons or switches, each of which may assume an applied (or depressed) position and a released position. Alternatively, operator interface 24 may comprise a touch screen display with a graphical user interface (GUI).

Each of dash interface controller 26, service brake con- troller 28, and parking brake controller 30 controls the operation of certain components of fluid circuit 14 in order to control the fluid pressure delivered to wheel brakes 12 and, therefore, the braking force applied to the wheels on the vehicle. In this manner, controllers 26, 28, 30 may be configured to implement service braking and parking/emer- gency braking as well as anti-lock braking (ABS), traction control and stability control when required. Controllers 26, 28, 30 may comprise programmable microprocessors or microcontrollers or may comprise application specific inte- grated circuits (ASIC). Each controller 26, 28, 30 may include a memory and a central processing unit (CPU). Each controller 26, 28, 30 may also include an input/output (I/O) interface including a plurality of input/output pins or termi- nals through which the controller 26, 28, 30 may receive a plurality of input signals and transmit a plurality of output signals. Controllers 26, 28, 30 may be configured to com- municate with one or more components of braking system 10 such as components of fluid circuit 14, sensors 16, 18, 20, 22, and operator interface 24 directly using dedicated (hard) wire connections. Alternatively, or in addition, controllers 26, 28, 30 may be configured to communicate with one or more components of braking system 10 such as components of fluid circuit 14, sensors 16, 18, 20, 22 and operator interface 24 using bus 88 and to communicate with other vehicle systems over the same or a similar bus.

Dash interface controller 26 is configured, in part, to generate and transmit brake control signals to electropneumatic module 60 to apply or release the parking brakes in wheel brakes 12 on drive axle 34, auxiliary axle 36 and on any trailers responsive to operator commands through operator interface 24. Controller 26 may also generate and transmit brake control signals to module 60 to apply or release the parking brakes responsive to signals from various sensor or systems on the vehicle that request or indicate the parking brake should be applied or released. Controller 26 may receive input signals including command signals from operator interface 24 and signals from other sensors and systems on the vehicle and may transmit output signals to components of fluid circuit 14 such as module 60 and to operator interface 24 to control outputs on interface 24 indirectly through bus 88 or through direct electrical connections between controller 26 and the individual components of system 10.

Service brake controller 28 is configured to control application and release of the service brakes in wheel brakes 12 on axles 32, 34, 36 and in any trailers in response to commands from an operator of the vehicle or from advanced driver assistance systems (ADAS) or automated driving systems (ADS) on the vehicle. Service brake controller 28 may receive input signals from a variety of sensors, including sensors 16, 18, 20, 22 and systems on the vehicle including, for example, automated emergency braking (AEB), anti-lock braking (ABS), collision avoidance, adaptive cruise control, traction control or stability control systems. Service brake controller 28 may transmit output signals to foot brake module 52, electropneumatic modules 54, 56, 58, modulators 62, 64, 66, 68, 70, 72, 74 and trailer control module 80 to control fluid flow through foot brake module 52, electropneumatic modules 54, 56, 58, modulators 62, 64, 66, 68, 70, 72, 74 and trailer control module 80 and control transmission and delivery of fluid pressure within fluid circuit 14. In accordance with one aspect of the systems and methods disclosed herein, service brake controller 28 is configured to broadcast control signals on communications bus 88 intended for foot brake module 52, electropneumatic modules 54, 56, 58, modulators 62, 64, 66, 68, 70, 72, 74 and trailer control module 80 to implement service braking.

Parking brake controller 30 is configured to control application and release of the parking brakes in wheel brakes 12 on axles 34, 36 and in any trailers in response to commands from an operator of the vehicle or from advanced driver assistance systems (ADAS) or automated driving systems (ADS) on the vehicle. Park brake controller 30 may receive input signals from a variety of sensors, including sensors 16, 18, 20, 22, and systems on the vehicle. Parking brake controller 30 may transmit output signals to electropneumatic module 60 and solenoid valves 84, 86 to control fluid flow through module 60 and solenoid valves 84, 86 and control transmission and delivery of fluid pressure within fluid circuit 14.

Service brake controller 28 may be configured to cause and/or maintain application of the service brakes in wheel brakes 12 in certain conditions even when the operator of the vehicle has not commanded actuation of the service brakes (through, e.g., actuation of a food pedal on foot valve module 52) to prevent vehicle roll away. For example, service brake controller 28 may cause or maintain application of the service brakes when the vehicle is in motion, but the operator is no longer in control of the vehicle because the operator is incapacitated or has exited the vehicle. Service brake controller 28 may also cause and/or maintain application of the service brakes if service brakes controller 28 determines that the vehicle is being started on a hill (hill start assist). If service brake controller 28 loses power, fails or can otherwise no longer communicate with other components of braking system 10, however, service brake controller 28 will be unable to prevent vehicle roll away when required.

Figure 2:
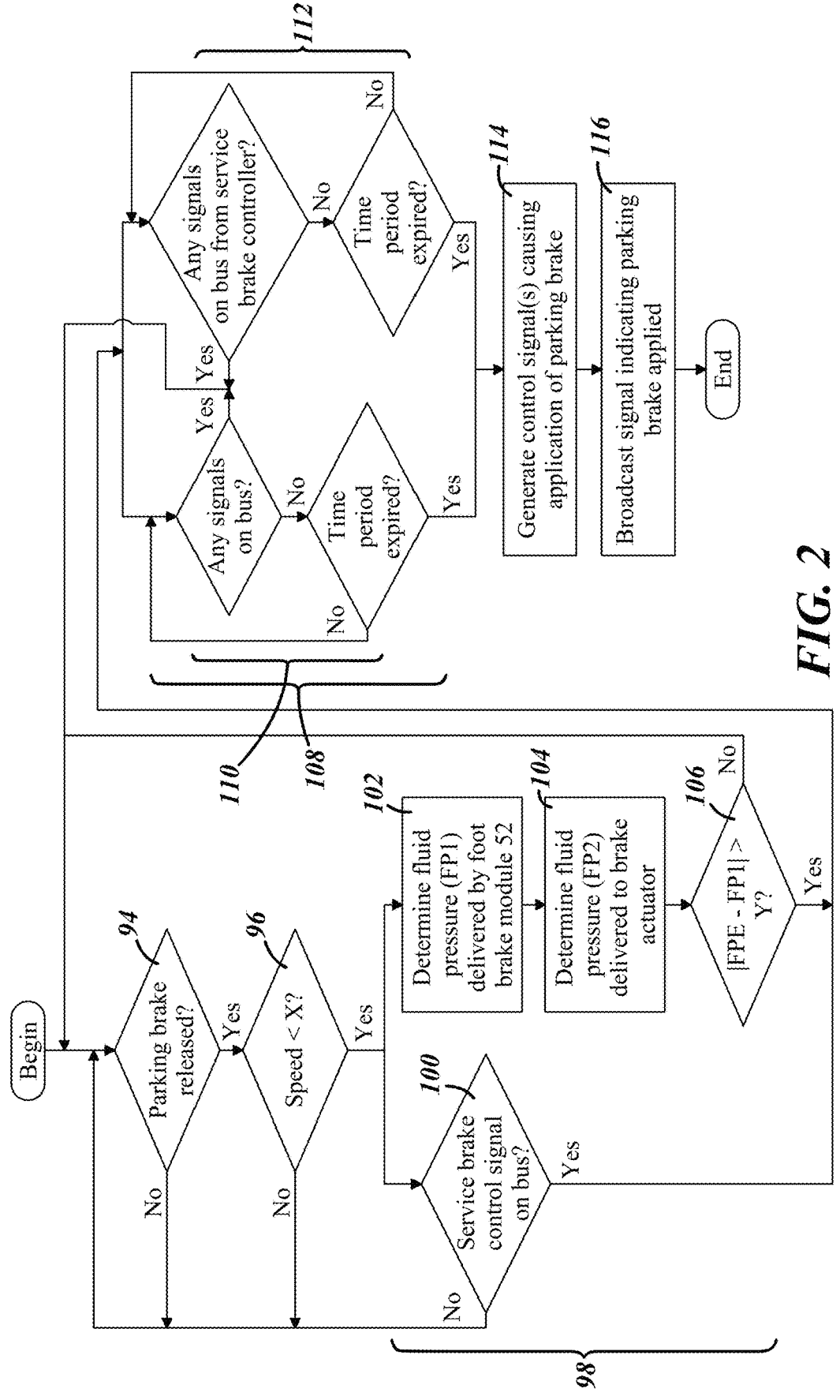
FIG. 2 is a flow chart diagram illustrating several steps in one embodiment of a method in accordance with the teachings set forth herein.

Referring now to FIG. 2, parking brake controller 30 may be configured with appropriate programming instructions (i.e., software or a computer program) to implement various steps in a method for controlling application of a parking brake to prevent vehicle roll away in situations where service brake controller 28 is unable to do so. The instructions or computer program may be encoded on a non-transitory computer storage medium such as a memory within, or accessible by, parking brake controller 30.

The method may begin with the step 94 of determining whether the parking brake is in an applied state or a released state. Information regarding the state of the parking brake may be stored in a memory within, or accessible by, parking brake controller 30, but can also be dynamically obtained by parking brake controller 30 in response to fluid pressure signals generated by one or more pressure sensors similar to sensors 20, 22 and indicative of the fluid pressure present in conduits 46 through which fluid pressure is delivered or exhausted to apply or release the parking brake (e.g., fluid conduits 46 between quick release valve 70 and wheel brakes 12 on drive axle 34 and auxiliary axle 36). Parking brake controller 30 may compare the measured fluid pressure to predetermined pressure thresholds to determine the state of the parking brake. When the parking brake is in an applied state, the fluid pressure in the conduits should be relatively low (ambient) and parking brake controller 30 may determine that the parking brake is in the applied state if the measured fluid pressure meets a predetermined condition relative to a low-pressure threshold (e.g., is less than the low-pressure threshold). When the parking brake is in a released state, the fluid pressure in the conduits should be relatively high (to counteract the force of a spring in the brake actuator) and parking brake controller 30 may determine that the parking brake is in the released state if the measured fluid pressure meets a predetermined condition relative to a high-pressure threshold (e.g., is greater than the high-pressure threshold). If parking brake controller 30 determines that the parking brake is in applied state, roll away should not occur. Therefore, no further action is required and the method may repeat step 94 until parking brake controller 30 determines that the parking brake is in a released state.

If parking brake controller 30 determines that the parking brake is in a released state, the method may continue with the step 96 of determining whether a speed of the vehicle meets a predetermined condition relative to a predetermined speed. Parking brake controller 30 may determine the speed of the vehicle responsive to a signal generated by a wheel speed sensor 16. Alternatively, parking brake controller 30 may determine the speed of the vehicle responsive to other measures of vehicle speed such as a transmission speed sensor. Parking brake controller 30 may also determine vehicle speed responsive to vehicle speed information broadcast by other vehicle systems on bus 88. After determining the speed of the vehicle, parking brake controller 30 will determine whether the vehicle speed meets a predetermined condition relative to a predetermined speed (e.g., is less than the predetermined speed). In general, vehicle roll away is a concern in situations where a vehicle is initially stationary (e.g., when parked on a hill and the parking brake is release or when the vehicle has been stopped, but the driver forgets or is unable to apply a brake). If the vehicle is traveling at a relatively high speed, the vehicle is likely not in a situation where roll away is a concern. Further, applying a parking brake while the vehicle is traveling at a relatively high speed may create a risk of damage to the vehicle and/or safety risks for the operator and surrounding pedestrians, vehicles and road infrastructure. If parking brake controller 30 determines that the speed does not meet the predetermined condition relative to the predetermined speed (e.g., the speed of the vehicle is greater than the predetermined speed), the method may return to step 94.

If parking brake controller 30 determines that the speed of the vehicle meets the predetermined condition relative to the predetermined speed (e.g., the speed of the vehicle is less than the predetermined speed), the method may proceed with the step 98 of determining whether a command to move the service brake to an applied state has been issued by a service brake controller. As discussed hereinabove, service brake controller 28 may be configured to cause and/or maintain application of the service brakes in wheel brakes 12 in certain conditions even when the operator of the vehicle has not commanded actuation of the service brakes in order to prevent vehicle roll away.

In one embodiment, step 98 may include a substep 100 in which parking brake controller 30 identifies a service brake control signal from service brake controller 28 that is broadcast on bus 88 and that is configured to cause electropneumatic modules 54, 56, 58 to deliver fluid pressure to brake actuators to move the service brakes from the released state to the applied state. Parking brake controller 30 may identify signals broadcast on bus 88 by service brake controller 28 or other components and systems in vehicle 10 in a conventional manner.

In another embodiment, step 98 may include substeps 102, 104, 106 in which parking brake controller 30 indirectly determines that service brake controller 28 has generated such a service brake control signal by measuring fluid pressures at various locations within the vehicle. In particular, parking brake controller 30 may be configured in substeps 102 and 104 to receive fluid pressure signals from pressure sensors 20 and 22 indicative of fluid pressure delivered through foot valve module 52 or another operator control valve on vehicle 10 and fluid pressure delivered to the brake actuator. If the operator of the vehicle has commanded application of the service brakes, a relatively high fluid pressure should be present at each of sensors 20 and 22 as fluid pressure is directed from one of fluid sources 38, 40 to the brake actuator. If the operator of the vehicle has not commanded application of the service brakes, and service brake controller 28 is not independently causing application of the service brakes, the fluid pressure at each of sensors 20, 22 should, in contrast, be relatively low. If, however, the operator of the vehicle has not commanded application of the service brakes, but service brake controller 28 has independently caused application of the service brakes, the fluid pressure at sensor 20 should be relatively low while the fluid pressure at sensor 22 should be relatively high. In substep 106, parking brake controller 30 determines whether the measured fluid pressures meet a predetermined condition. For example, in one embodiment, parking brake controller 30 may determine whether a difference between the two fluid pressures is greater than a predetermined value. If the difference between the two fluid pressures is greater than the predetermined value, parking brake controller 30 determines that a command to move the service brake to an applied state has been issued by service brake controller 28 (despite the absence of a request to apply the service brake by an operator of the vehicle). In an alternate embodiment, parking brake controller 30 may determine whether each of the measured fluid pressures meets a different predetermined condition relative to a different predetermined value. For example, parking brake controller 30 may determine that the service brake is in an applied state despite the absence of a request to apply the service brake by an operator of the vehicle if the fluid pressure measured by sensor 20 is less than a predetermined lower threshold and the fluid pressure measured by sensor 22 is greater than a predetermined upper threshold.

If parking brake controller 30 determines that a command to move the service brake to an applied state has not been issued by service brake controller 28, the method may return to step 94. If, however, parking brake controller 30 does determine that a command to move the service brake to an applied state has been issued by service brake controller 28, the method may proceed to step 108. Although steps 94, 96, 98 are illustrated in a particular sequence in FIG. 2, it should be understood that steps 94, 96, 98 could be performed in any order and that parking brake controller 30 will proceed to step 108 once all of the conditions set forth in steps 94, 96, 98 are present.

In step 108, parking brake controller 30 is configured to identify an absence of communications on bus 88. In one embodiment, parking brake controller 30 is configured, in substep 110, to identify the absence of any signals broadcast on bus 88 over a predetermined period of time. The complete absence of any signals broadcast on bus 88 may be indicative of a failure of the bus 88 itself. In the event of a failure of bus 88, service brake control signals from service brake controller 28 intended to prevent vehicle roll away will not be transmitted to electropneumatic modules, 54, 56, 58 and, therefore, service braking will not be maintained.

In another embodiment, parking brake controller 30 is configured, in substep 112, to identify an absence of signals broadcast on bus 88 by service brake controller 28 over a predetermined period of time following broadcast of the service brake control signal previously identified in step 98 (either directly in substep 100 or indirectly in substeps 102, 104, 106). The absence of further signals broadcast on bus 88 by service brake controller 28 after the service brake control signal may be indicative of a failure of service brake controller 28. In the event of a failure of service brake controller 28, controller 28 will not generate and transmit signals to electropneumatic modules, 54, 56, 58 and, therefore, service braking will not be maintained. In performing step 110 or 112, parking brake controller 30 may be configured to initiate a timer or counter following broadcast of the service brake control signal identified in step 98 and to monitor bus 88 for further signals from service brake controller 28 until the timer or counter indicates that the predetermined period of time has passed. In one embodiment, the predetermined period of time may be equivalent to ten (10) times the known broadcast rate for the message containing the service brake control signal.

If further communications are present on buss 88 during the predetermined period of time (i.e., any further communications on bus 88 in one embodiment, any further communications from service brake controller 28 on bus 88 in another embodiment), parking brake controller 30 may repeat step 110 in some embodiments and/or return to step 94. If parking brake controller 30 identifies an absence of the communications on bus 88 (i.e., the absence of any further communications on bus 88 in one embodiment, the absence of any further communications from service brake controller 28 on bus 88 in another embodiment), the method may proceed to step 114 in which parking brake controller generates a parking brake control signal configured to cause the electropneumatic module 60 to exhaust fluid pressure from the brake actuator for a wheel brake and move the parking brake from the released state to an applied state. In this manner, parking brake controller 30 applies the parking brake to prevent vehicle roll away in situations where controller 30 determines that service brake controller 28, despite having previously applied the service brake to prevent vehicle roll away, may no longer be able to do so. The parking brake control signal may be transmitted to, for example, one of solenoid valves 84, 86 which will in turn cause module 60 and quick release valve 70 to exhaust fluid pressure from the conduits leading to the brake actuators in the wheel brakes for drive axle 34 and auxiliary axle 36 and apply the associated parking brakes.

In embodiments where the absence of communications on bus 88 is limited to an absence of communications from service brake controller 28 (and, therefore, there is no indication that bus 88 has itself failed), parking brake controller may also broadcast a parking brake applied signal on bus 88 indicating that the parking brake has been applied. Dash interface controller 26 may, for example, activate a visual, audio, or haptic indicator of the application of the parking brake responsive to the parking brake applied signal for the benefit of the operator of the vehicle.

A brake control system 10 and method in accordance with the teachings disclosed herein is advantageous relative to conventional systems and methods. In particular, the system 10 and method prevent vehicle roll away by applying a parking brake when conditions are identified that are indicative of a possible failure of a system on the vehicle that would ordinarily apply a service brake to prevent vehicle roll away.

While the invention has been shown and described with reference to one or more particular embodiments thereof, it will be understood by those of skill in the art that various changes and modifications can be made without departing from the spirit and scope of the invention.

What is claimed is:

1. A brake control system for a vehicle, comprising:
   a fluid circuit including a first electropneumatic module configured to control fluid pressure in a brake actuator for a first wheel brake to apply and release a service brake and a second electropneumatic module configured to control fluid pressure in a brake actuator for one of the first wheel brake and a second wheel brake to apply and release a parking brake; and,
   a parking brake controller configured to
       determine whether the parking brake is in an applied state or a released state;
       determine whether a speed of the vehicle meets a predetermined condition relative to a predetermined speed;
       determine whether a command to move the service brake to an applied state has been issued by a service brake controller;
       identify, when (i) the parking brake is in the released state, (ii) the speed of the vehicle meets the predetermined condition relative to the predetermined speed, and (iii) the command to move the service brake to the applied state has been issued by the service brake controller, an absence of communication on a communications bus; and, generate, after identifying the absence of communication on the communications bus, a parking brake control signal configured to cause the second electropneumatic module to exhaust fluid pressure from the brake actuator for the one of the first wheel brake and the second wheel brake to move the parking brake from the released state to an applied state.

2. The system of claim 1 wherein the parking brake controller is configured, in determining whether the command to move the service brake to the applied state has been issued by the service brake controller, to identify a service brake control signal broadcast on the communications bus by a service brake controller, the service brake control signal configured to cause the first electropneumatic module to deliver fluid pressure to the brake actuator for the first wheel brake to move the service brake from the released state to an applied state.

3. The system of claim 2 wherein the parking brake controller is configured, in identifying the absence of communication on the communications bus, to identify an absence of signals broadcast on the communications bus by the service brake controller over a predetermined period of time following broadcast of the service brake control signal.

4. The system of claim 1 wherein the parking brake controller is configured, in determining whether the command to move the service brake to the applied state has been issued by the service brake controller, to:
   receive a first fluid pressure signal from a first pressure sensor, the first fluid pressure signal indicative of a first fluid pressure delivered through an operator control valve;
   receive a second fluid pressure signal from a second pressure sensor, the second fluid pressure signal indicative of fluid pressure delivered to the brake actuator for the first wheel brake to move the service brake from a released state to the applied state; and,
   determine whether the first fluid pressure and the second fluid pressure meet a predetermined condition.

5. The system of claim 1 wherein the parking brake controller is configured, in identifying the absence of communication on the communications bus, to identify an absence of signals broadcast on the communications bus over a predetermined period of time.

6. The system of claim 1 wherein the parking brake controller is configured, in identifying an absence of communication on the communications bus, to identify an absence of signals broadcast on the communications bus over a predetermined period of time by the service brake controller.

7. The system of claim 1 wherein the parking brake controller is further configured to broadcast, after generating the parking brake control signal, a parking brake applied signal on the communications bus.

8. An article of manufacture, comprising:
   a non-transitory computer storage medium having a computer program encoded thereon that, when executed by a parking brake controller of a brake control system for a vehicle, controls application of a parking brake, the brake control system including a fluid circuit including a first electropneumatic module configured to control fluid pressure in a brake actuator for a first wheel brake to apply and release a service brake and a second electropneumatic module configured to control fluid pressure in a brake actuator for one of the first wheel brake and a second wheel brake to apply and release the parking brake, the computer program include code for:

determining whether the parking brake is in an applied state or a released state;

determining whether a speed of the vehicle meets a predetermined condition relative to a predetermined speed;

determining whether a command to move the service brake to an applied state has been issued by a service brake controller;

identifying, when (i) the parking brake is in the released state, (ii) the speed of the vehicle meets the predetermined condition relative to the predetermined speed, and (iii) the command to move the service brake to the applied state has been issued by the service brake controller, an absence of communication on a communications bus; and, generating, after identifying the absence of communication on the communications bus, a parking brake control signal configured to cause the second electropneumatic module to exhaust fluid pressure from the brake actuator for the one of the first wheel brake and the second wheel brake to move the parking brake from the released state to an applied state.

9. The article of manufacture of claim 8 wherein the code for determining whether the command to move the service brake to the applied state has been issued by the service brake controller includes code for identifying a service brake control signal broadcast on the communications bus by the service brake controller, the service brake control signal configured to cause the first electropneumatic module to deliver fluid pressure to the brake actuator for the first wheel brake to move the service brake from the released state to an applied state.

10. The article of manufacture of claim 9 wherein the code for identifying the absence of communication on the communications bus, includes code for identifying an absence of signals broadcast on the communications bus by the service brake controller over a predetermined period of time following broadcast of the service brake control signal.

11. The article of manufacture of claim 8 wherein the code for determining whether the command to move the service brake to the applied state has been issued by the service brake controller includes code for:

receiving a first fluid pressure signal from a first pressure sensor, the first fluid pressure signal indicative of a first fluid pressure delivered through an operator control valve;

receiving a second fluid pressure signal from a second pressure sensor, the second fluid pressure signal indicative of fluid pressure delivered to the brake actuator for the first wheel brake to move the service brake from a released state to the applied state; and, determine whether the first fluid pressure and the second fluid pressure meet a predetermined condition.

12. The article of manufacture of claim 8 wherein the code for identifying the absence of communication on the communications bus includes code for identifying an absence of signals broadcast on the communications bus over a predetermined period of time.

13. The article of manufacture of claim 8 wherein the code for identifying the absence of communication on the communications bus includes code for identifying an absence of signals broadcast on the communications bus over a predetermined period of time by the service brake controller.

14. The article of manufacture of claim 8 wherein the computer program further includes code for broadcasting, after generating the parking brake control signal, a parking brake applied signal on the communications bus.

15. A method for controlling application of a parking brake of a brake control system for a vehicle, the brake control system including a fluid circuit including a first electropneumatic module configured to control fluid pressure in a brake actuator for a first wheel brake to apply and release a service brake and a second electropneumatic module configured to control fluid pressure in a brake actuator for one of the first wheel brake and a second wheel brake to apply and release the parking brake, the method comprising:

determining whether the parking brake is in an applied state or a released state;

determining whether a speed of the vehicle meets a predetermined condition relative to a predetermined speed;

determining whether a command to move the service brake to an applied state has been issued by a service brake controller;

identifying, when (i) the parking brake is in the released state, (ii) the speed of the vehicle meets the predetermined condition relative to the predetermined speed, and (iii) the command to move the service brake to the applied state has been issued by the service brake controller, an absence of communication on a communications bus; and, generating, after identifying the absence of communication on the communications bus, a parking brake control signal configured to cause the second electropneumatic module to exhaust fluid pressure from the brake actuator for the one of the first wheel brake and the second wheel brake to move the parking brake from the released state to an applied state.

16. The method of claim 15 wherein determining whether the command to move the service brake to the applied state has been issued by the service brake controller includes identifying a service brake control signal broadcast on the communications bus by the service brake controller, the service brake control signal configured to cause the first electropneumatic module to deliver fluid pressure to the brake actuator for the first wheel brake to move the service brake from the released state to an applied state.

17. The method of claim 16 wherein identifying the absence of communication on the communications bus includes identifying an absence of signals broadcast on the communications bus by the service brake controller over a predetermined period of time following broadcast of the service brake control signal.

18. The method of claim 15 wherein determining whether the command to move the service brake to the applied state has been issued by the service brake controller includes:

receiving a first fluid pressure signal from a first pressure sensor, the first fluid pressure signal indicative of a first fluid pressure delivered through an operator control valve;

receiving a second fluid pressure signal from a second pressure sensor, the second fluid pressure signal indicative of fluid pressure delivered to the brake actuator for the first wheel brake to move the service brake from a released state to the applied state; and, determining whether the first fluid pressure and the second fluid pressure meet a predetermined condition.

19. The method of claim 15 wherein identifying the absence of communication on the communications bus includes identifying an absence of signals broadcast on the communications bus over a predetermined period of time.

20. The method of claim 15 wherein identifying the absence of communication on the communications bus includes identifying an absence of signals broadcast on the communications bus over a predetermined period of time by the service brake controller.

* * * * *